(12) United States Patent
Fang et al.

(10) Patent No.: US 10,705,623 B2
(45) Date of Patent: Jul. 7, 2020

(54) ADJUSTABLE KEYBOARD

(71) Applicants: Hao-Jen Fang, Taipei (TW);
Ming-Hsuan Ho, Taipei (TW);
Chen-Yi Huang, Taipei (TW);
Kung-Ju Chen, Taipei (TW); Hsuan-I Chao, Taipei (TW)

(72) Inventors: Hao-Jen Fang, Taipei (TW);
Ming-Hsuan Ho, Taipei (TW);
Chen-Yi Huang, Taipei (TW);
Kung-Ju Chen, Taipei (TW); Hsuan-I Chao, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 0 days.

(21) Appl. No.: 16/388,877

(22) Filed: Apr. 19, 2019

(65) Prior Publication Data
US 2019/0332185 A1 Oct. 31, 2019

Related U.S. Application Data

(60) Provisional application No. 62/662,226, filed on Apr. 25, 2018.

(51) Int. Cl.
*H01H 13/7065* (2006.01)
*G06F 3/02* (2006.01)
(Continued)

(52) U.S. Cl.
CPC .......... *G06F 3/0202* (2013.01); *G06F 3/0208* (2013.01); *G06F 3/0216* (2013.01); *H01H 3/32* (2013.01); *H01H 9/22* (2013.01); *H01H 9/24* (2013.01); *H01H 9/28* (2013.01); *H01H 13/704* (2013.01); *H01H 13/7065* (2013.01); *H01H 13/7073* (2013.01); *H01H 2003/323* (2013.01);
(Continued)

(58) Field of Classification Search
CPC .... G06F 3/0208; G06F 3/0216; G06F 3/0221; G06F 3/0224; H01H 13/7065; H01H 13/705; H01H 9/0207; H01H 1/34; H01H 2003/323; H01H 2221/032; H01H 2215/002; H01H 9/22; H01H 9/24; H01H 9/28
See application file for complete search history.

(56) References Cited

U.S. PATENT DOCUMENTS 7,230,190 B1 6/2007 Kwong et al.
7,855,715 B1* 12/2010 Bowen .................. G06F 3/0234
345/168
(Continued)

FOREIGN PATENT DOCUMENTS

CN 204808216 11/2015

*Primary Examiner* — Felix O Figueroa
(74) *Attorney, Agent, or Firm* — JCIPRNET

(57) ABSTRACT

An adjustable keyboard includes a driving element, a first plate, a second plate and a plurality of keys. The second plate is disposed between the first plate and the keys, wherein the second plate has a plurality of key openings and the keys are respectively aligned with the key openings. The driving element is configured to drive the first plate to move, and thus a plurality of first guide portions on the first plate respectively push a plurality of second guide portions on the second plate so as to move the second plate and adjust the distance between each of the keys and the corresponding key opening.

13 Claims, 12 Drawing Sheets

(51) Int. Cl.
*H01H 13/7073* (2006.01)
*H01H 13/704* (2006.01)
*H01H 9/22* (2006.01)
*H01H 3/32* (2006.01)
*H01H 9/24* (2006.01)
*H01H 9/28* (2006.01)

(52) U.S. Cl.
CPC ... *H01H 2215/002* (2013.01); *H01H 2221/01* (2013.01); *H01H 2221/032* (2013.01)

(56) References Cited

U.S. PATENT DOCUMENTS

| | | | | |
|---|---|---|---|---|
| 8,309,870 B2* | 11/2012 | Peterson | ............... | G06F 3/0202 |
| | | | | 200/344 |
| 8,420,965 B2* | 4/2013 | Rappoport | ............. | H01H 13/85 |
| | | | | 200/249 |
| 9,293,278 B2* | 3/2016 | Bokma | .............. | H03K 17/9622 |
| 9,443,675 B2* | 9/2016 | Wu | ........................ | H01H 13/83 |
| 9,983,633 B2* | 5/2018 | Tamura | ................. | G06F 1/1662 |
| 2019/0244772 A1* | 8/2019 | Wang | ..................... | H01H 3/125 |

* cited by examiner

ADJUSTABLE KEYBOARD

CROSS REFERENCE TO RELATED APPLICATION

This application claims the priority benefit of U.S. provisional application Ser. No. 62/662,226, filed on Apr. 25, 2018. The entirety of the above-mentioned patent application is hereby incorporated by reference herein and made a part of specification.

BACKGROUND

Technical Field

The disclosure relates to a keyboard, and specifically relates to an adjustable keyboard.

Description of Related Art

Keyboard is a common physical input or an operation interface, the user can operate, control or input data into the electronic device through the keyboard. Generally, the keyboard can be roughly categorized into membrane keyboard and mechanical keyboard. The membrane keyboard includes keys, conductive film, rubber domes and scissor structures. The keys are supported by the scissor structures to be hung above the conductive film, and the rubber domes are disposed between the keys and the conductive film. The scissor structures can be used to determine the pressing stroke and the moving direction of the keys, and the rubber domes can be used to electrically connect the circuit contacts on the conductive film. On the other hand, a mechanical switch is provided under each key in the mechanical keyboard to trigger the signal, and the pressing stroke and moving direction of each key are determined by the mechanical switch. Regardless of membrane keyboard or mechanical keyboard, the pressing stroke of the key is determined at the factory, and it is difficult for the user to adjust the pressing stroke of the key according to the personal operation requirements.

SUMMARY

The disclosure provides an adjustable keyboard capable of adjusting the pressing stroke.

An adjustable keyboard of the disclosure includes a driving element, a first plate, a second plate and a plurality of keys. The driving element is configured to rotate around an axis or slide along a driving direction. The first plate is, mechanically coupled to the driving element. The first plate includes a plurality of first guide portions, and the first plate is configured to be driven by the driving element to move along a first moving direction. The second plate is disposed above the first plate. The second plate includes a plurality of second guide portions, each of the first guide portions abuts against one of the second guide portions, and the second plate is configured to be driven by the first plate to move along a second moving direction. The keys are disposed above the second plate. The second plate has a plurality of key openings, and the keys are respectively aligned with the key openings. The distance between each of the keys and the corresponding key opening is changed according to the movement of the second plate.

In one embodiment of the disclosure, the adjustable keyboard further includes a case, and the driving element, the first plate, and the second plate are movably disposed in the case.

In one embodiment of the disclosure, the case has an assembling hole, the driving element is located outside the assembling hole. The first plate further includes a driven part and a first moving part connected to the driven part, at least a portion of the driven part is located outside of the assembling hole, and the driving element is mechanically coupled to the driven part. The first guide portions are located on the first moving part, the first moving part is located inside the assembling hole. The second plate is located inside the assembling hole, the second plate further includes a second moving part, the second guide portions are located on the second moving part, and the first guide portions and the second guide portions are located between the first moving part and the second moving part.

In one embodiment of the disclosure, each of the first guide portions has a stepped guide surface, and each of the second guide portion has a trapezoidal guide surface. The stepped guide surface of each of the first guide portions slidably abuts against the trapezoidal guide surface of the corresponding second guide portion.

In one embodiment of the disclosure, each of the keys has an outer leaning surface, and each of the key openings has an inner bearing surface. At least one of the outer leaning surface of each of the keys and the inner bearing surface of the corresponding key opening is configured with a buffer layer.

In one embodiment of the disclosure, an inner diameter of each of the key openings gradually decreases in the second moving direction towards the first plate, and an outer diameter of each of the keys gradually decreases in the second moving direction towards the first plate.

In one embodiment of the disclosure, a maximum outer diameter of each of the keys is greater than a minimum inner diameter of the corresponding key opening.

In one embodiment of the disclosure, the driving element is configured to rotate around the axis, and the driving element includes a rotating part and a drive gear opposite to the rotating part. The drive gear engages with a driven gear rack of the first plate.

In one embodiment of the disclosure, the driving element is configured to rotate around the axis, and the driving element is a cam. The cam abuts against the driven part of the first plate.

In one embodiment of the disclosure, the adjustable keyboard further includes an elastic member which have two opposite ends respectively connected to a fixed end and the first plate. The driving element and the elastic member are located at two opposite sides of the first plate.

In one embodiment of the disclosure, the driving element is configured to slide along the driving direction, and the driving element is fixed to a driven part of the first plate. The first plate further includes a positioning part extending from the driven part, and the adjustable keyboard further includes a positioning member. The positioning part is located between the positioning member and the driven part, and the positioning part is mechanically coupled to the positioning member.

In one embodiment of the disclosure, the adjustable keyboard further includes a guiding member extending along the second moving direction and penetrating through the second plate.

In one embodiment of the disclosure, the adjustable keyboard further includes an elastic member sleeved on the guiding member, and two ends of the elastic member are respectively connected to a fixed end and the second plate.

Based on the above, the adjustable keyboard of the disclosure is configured with a mechanical adjustment mechanism, so the user can actively and intuitively adjust the pressing stroke of the key according to personal requirements, so as to obtain different hand feelings while operating the adjustable keyboard. In other words, the adjustable keyboard of the disclosure has an excellent operation flexibility.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
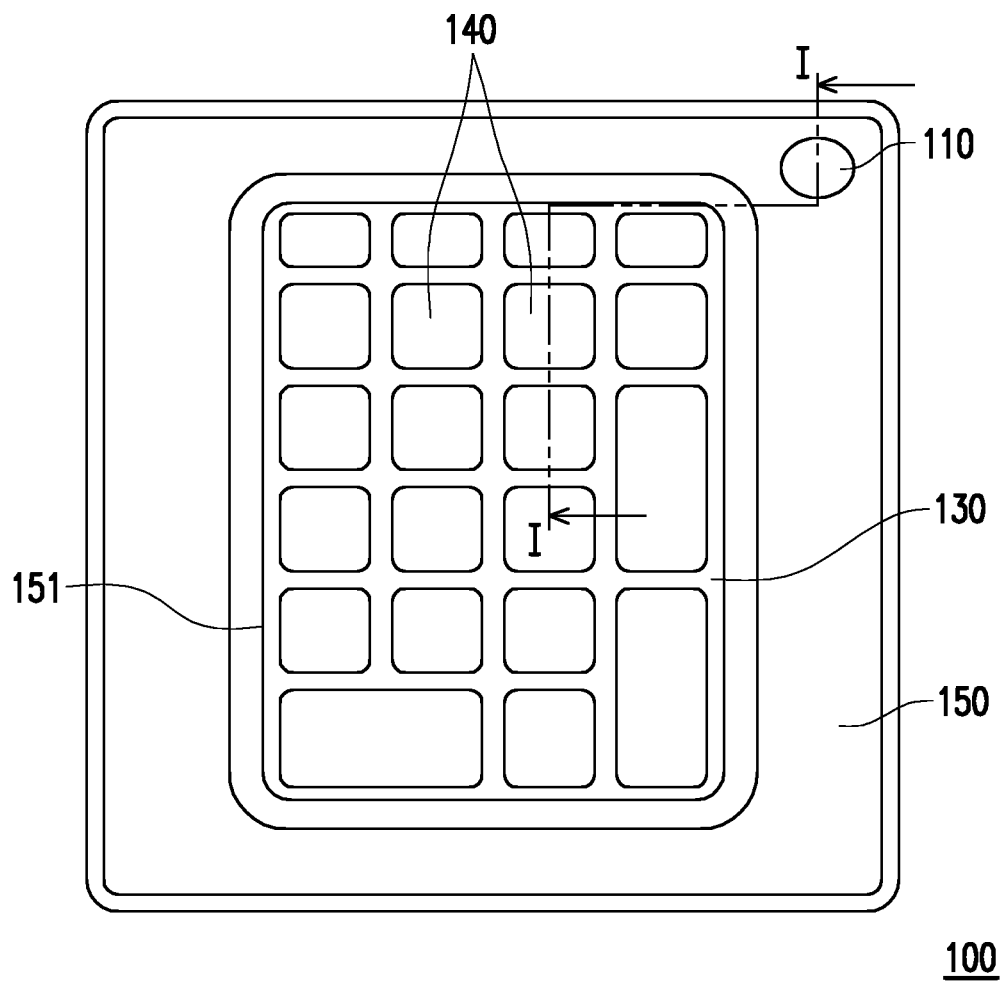
FIG. 1A is a schematic top view of an adjustable keyboard according to the first embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 1B:
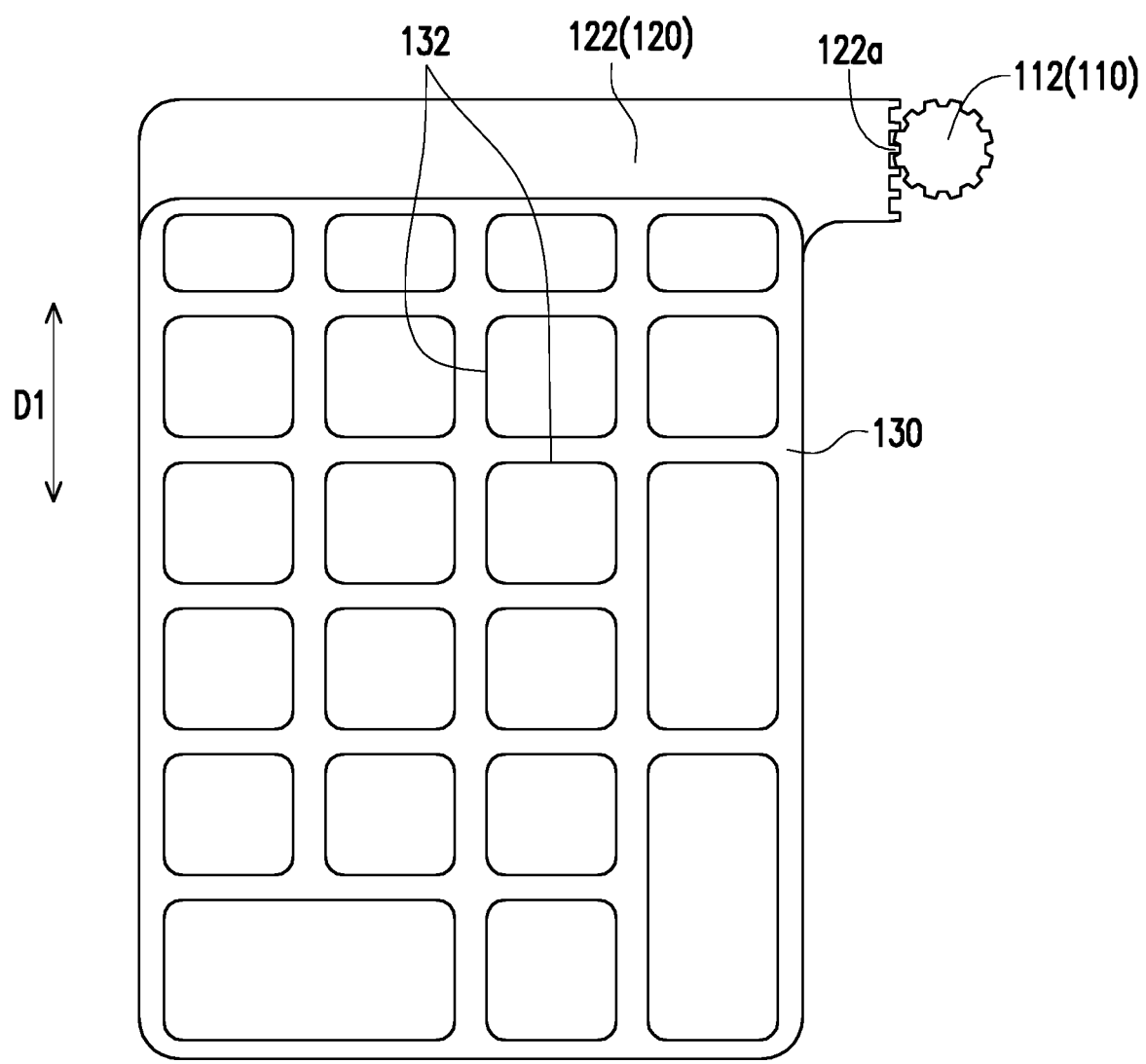
FIG. 1B and FIG. 1C are schematic top views of the interior of the adjustable keyboard in FIG. 1A at two different states.
Figure 1C:
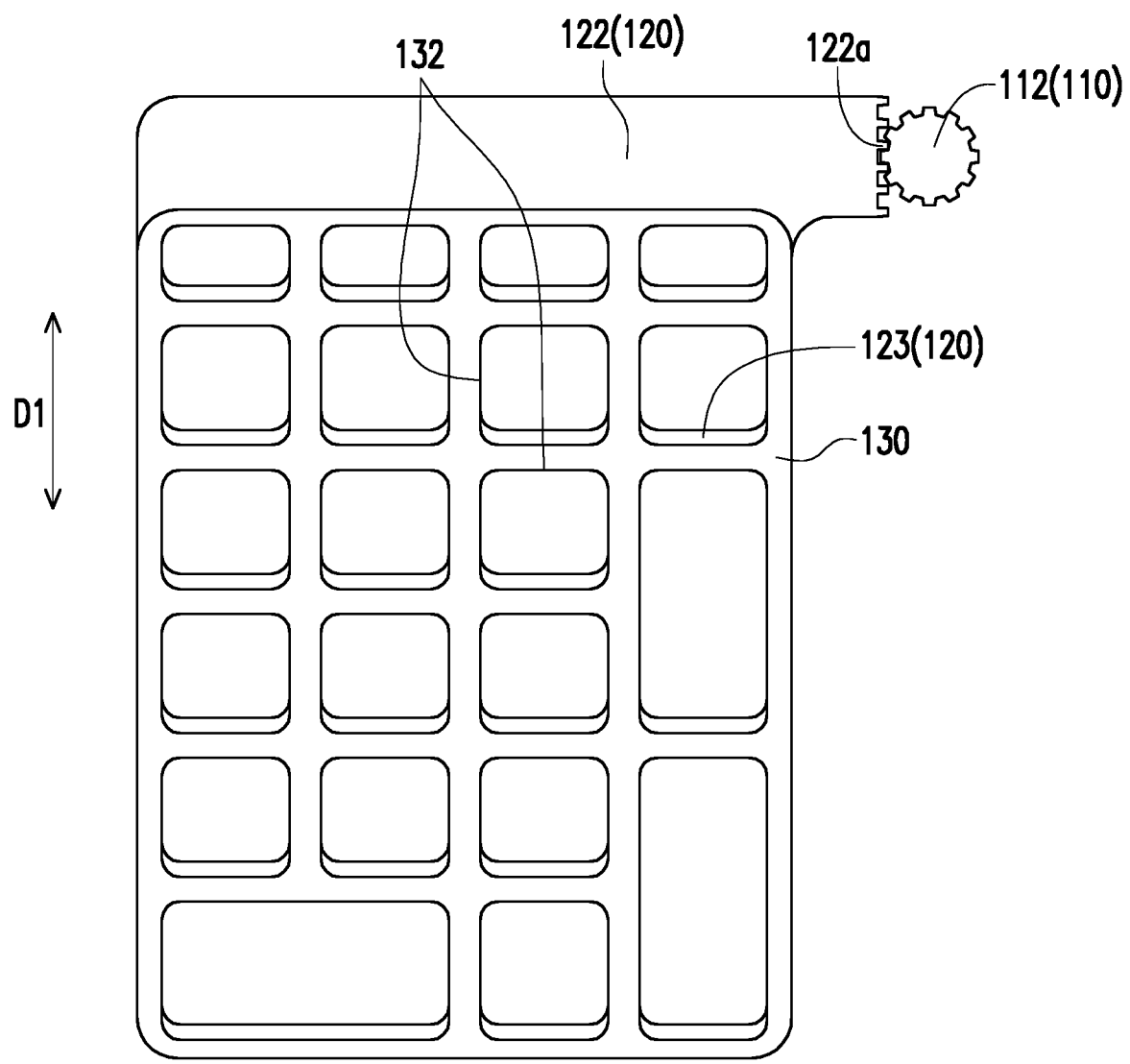
Figure 2A:
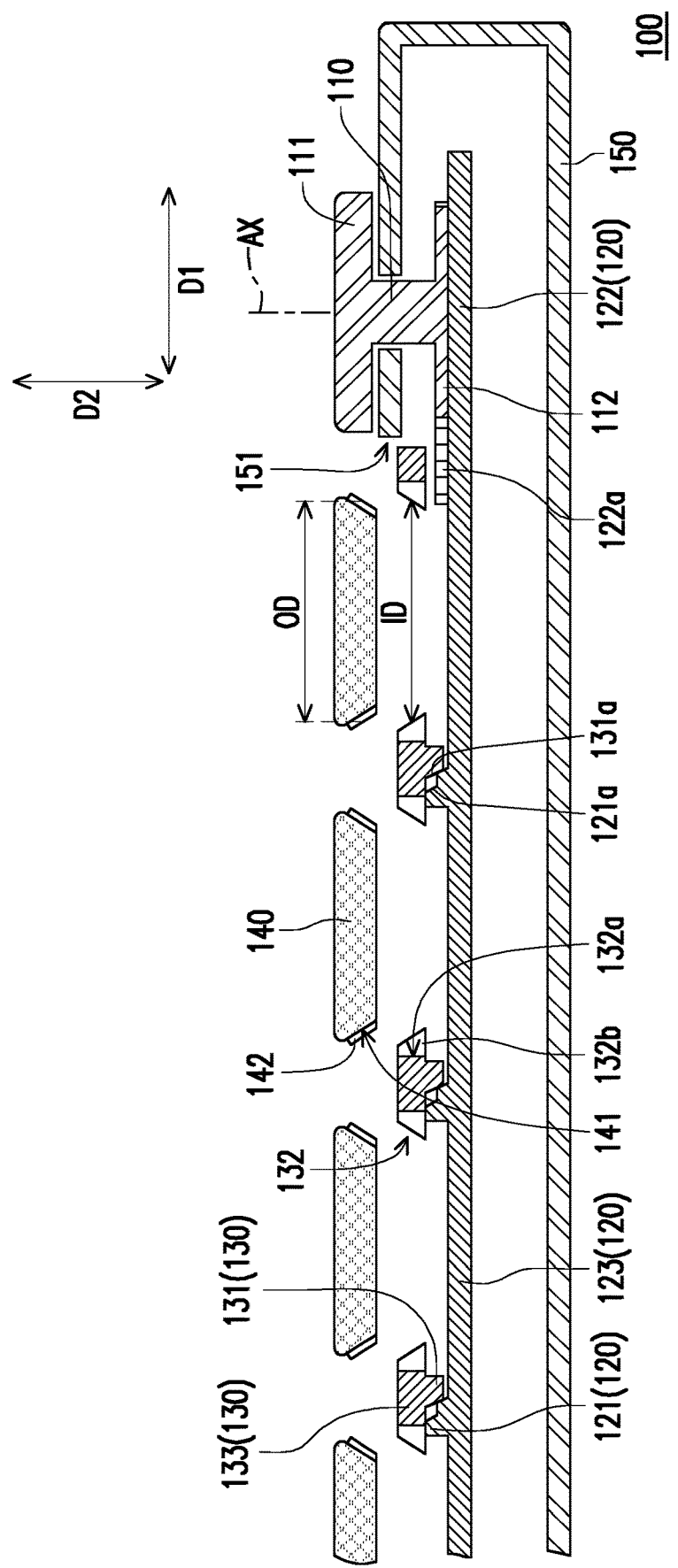
FIG. 2A to FIG. 2C are partial cross-sectional views of the adjustable keyboard in FIG. 1A along the section line I-I at three different states.
Figure 2B:
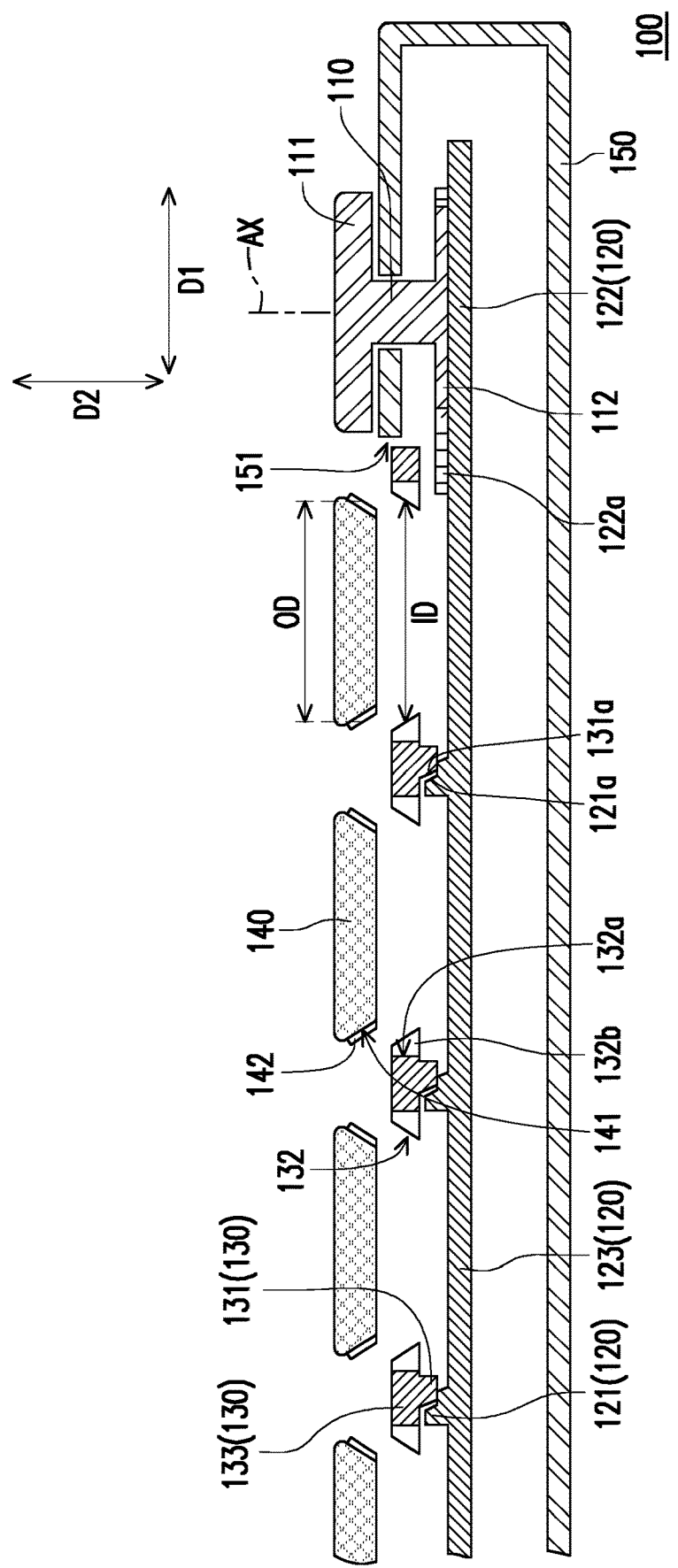
Figure 2C:
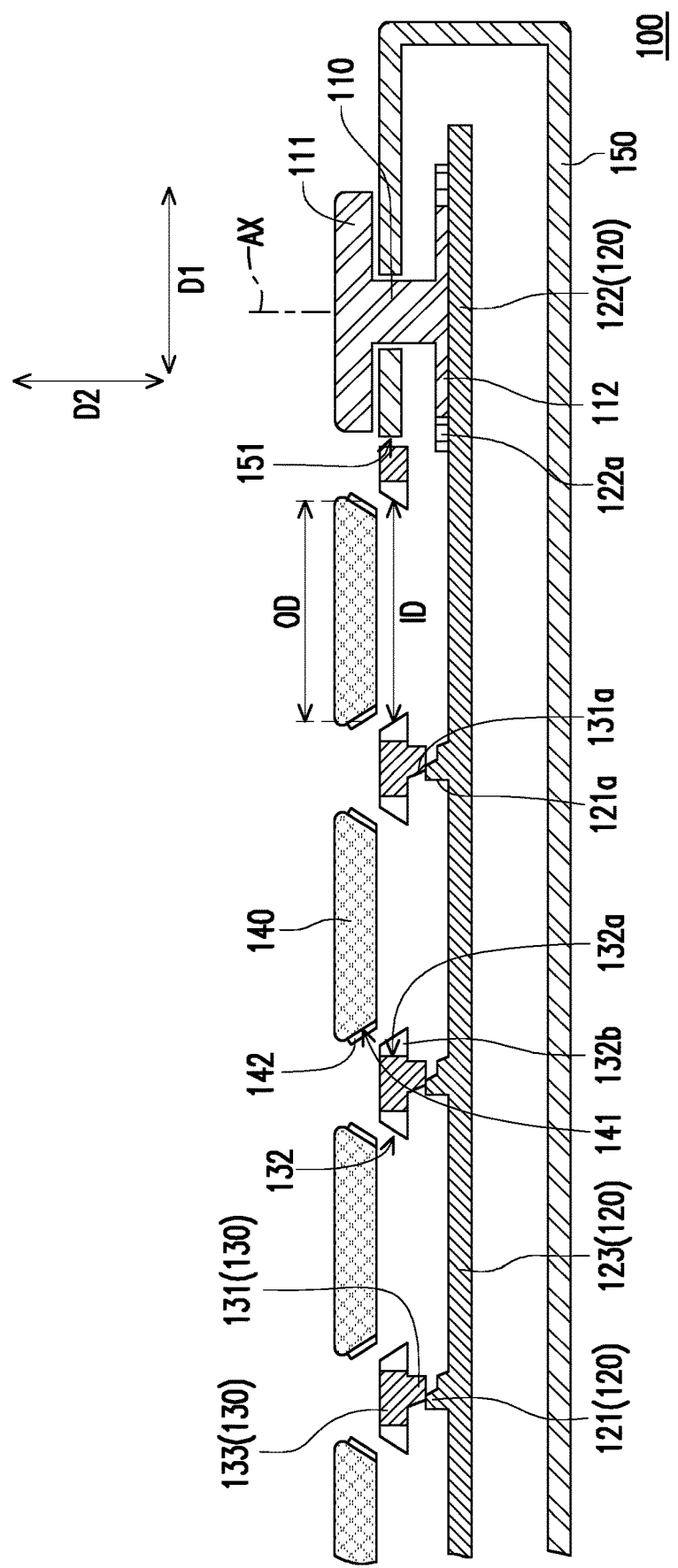

FIG. 1A is a schematic top view of an adjustable keyboard according to the first embodiment of the disclosure. FIG. 1B and FIG. 1C are schematic top views of the interior of the adjustable keyboard in FIG. 1A at two different states. FIG. 2A to FIG. 2C are partial cross-sectional views of the adjustable keyboard in FIG. 1A along the section line I-I at three different states. Referring to FIG. 1A, FIG. 1B, FIG. 1C, and FIG. 2A, in the present embodiment, an adjustable keyboard 100 at least includes a driving element 110, the first plate 120, the second plate 130, and a plurality of keys 140. The driving element 110 is configured to rotate around an axis AX and is mechanically coupled to the first plate 120. The first plate 120 is configured to move along the first moving direction D1 and is driven by the rotation of the driving element 110. The second plate 130 is disposed above the first plate 120, and a guiding structure is disposed between the first plate 120 and the second plate 130.

Accordingly, in the process of the first plate 120 moving along the first moving direction D1, the first plate 120 drives the second plate 130 by utilizing the guiding structure, so as to instruct the second plate 130 to move along the second moving direction D2, such as ascending or descending shown in FIG. 2A to FIG. 2C. For example, the second moving direction D2 may be perpendicular to the first moving direction D1 and is parallel to the axis AX, but the disclosure is not limited thereto.

On the other hand, the keys 140 are disposed above the second plate 130, the second plate 130 is located between the keys 140 and the first plate 120, and the distance between the keys 140 and the first plate 120 may be fixed. When the second plate 130 ascends along the second moving direction D2, the distance between the keys 140 and the second plate 130 is decreased. When the second plate 130 descends along the second moving direction D2, the distance between the keys 140 and the second plate 130 is increased. In other words, the user can decrease or increase the distance between the keys 140 and the second plate 130 to decrease or increase the pressing stroke of the keys 140, so as to obtain different hand feelings while operating the adjustable keyboard 100. The adjusting mechanism of the pressing stroke of the keys 140 is conveniently and intuitively operated by the user and can be flexibly adjusted according to personal requirements.

Furthermore, the guiding structure disposed between the first plate 120 and the second plate 130 includes a plurality of first guide portions 121 and a plurality of second guide portions 131. The first guide portions 121 are considered as a portion of the first plate 120, and the second guide portions 131 are considered as a portion of the second plate 130. The first guide portions 121 and the second guide portions 131 adopt one-to-one configuration. In other words, each of the first guide portions 121 abuts against one of the second guide portions 131.

Referring to FIG. 1A to FIG. 1C and FIG. 2A to FIG. 2C, when the first plate 120 and the first guide portions 121 disposed thereon are moved in the first moving direction D1, the first guide portions 121 respectively press against the second guide portions 131, so that the second plate 130 is driven to move along the second moving direction D2, such as ascending and descending. In the present embodiment, each of the first guide portions 121 has a stepped guide surface 121a, and each of the second guide portions 131 has a trapezoidal guide surface 131a. The stepped guide surface 121a of each of the first guide portions 121 may be slidably abuts against the trapezoidal guide surface 131a of the corresponding second guide portion 131, and at least a part of the cross-sectional profile of the stepped guide surface 121a of each of the first guide portions 121 and the cross-sectional profile of the trapezoidal guide surface 131a of the corresponding second guide portion 131 are complementary or matched with one another, so that each of the first guide portions 121 and the corresponding second guide portion 131 smoothly slide relative with each other.

Furthermore, the stepped guide surface 121a of each of the first guide portion 121 can be configured to make the corresponding second guide portion 131 ascend or descend in multi-stages (or stagewise). When a flat surface of the trapezoidal guide surface 131a of each of the second guide portion 131 and a flat surface of the stepped guide surface 121a of the corresponding first guide portion 121 abut against each other, each of the second guide portion 131 can stably lean against the corresponding first guide portion 121, and thus accidentally sliding would not be occurred easily. In other embodiments, the guide surface of each of the first guide portion and the guide surface of the corresponding second guide portion can adopt surfaces having different geometric shapes, such as inclined surface, curved surface, trapezoidal surface, stepped surface, or the combination thereof.

In the present embodiment, the second plate 130 has a plurality of key openings 132, and the keys 140 and the key openings 132 adopt one-to-one configuration. In other words, each of the keys 140 is aligned with (or faces) one of the key openings 132. The distance between each of the keys 140 and the corresponding key opening 132 is changed according to the movement of the second plate 130. As shown from FIG. 2A to FIG. 2C, the distance between each of the keys 140 and the corresponding key opening 132 is changed to become smaller. As shown in the state of FIG. 2A, each of the keys 140 has a maximum pressing stroke. As shown in state of FIG. 2C, each of the keys 140 has a minimum pressing stroke. As shown in state of FIG. 2B, each of the keys 140 has an intermediate pressing stroke.

Figure 3B:
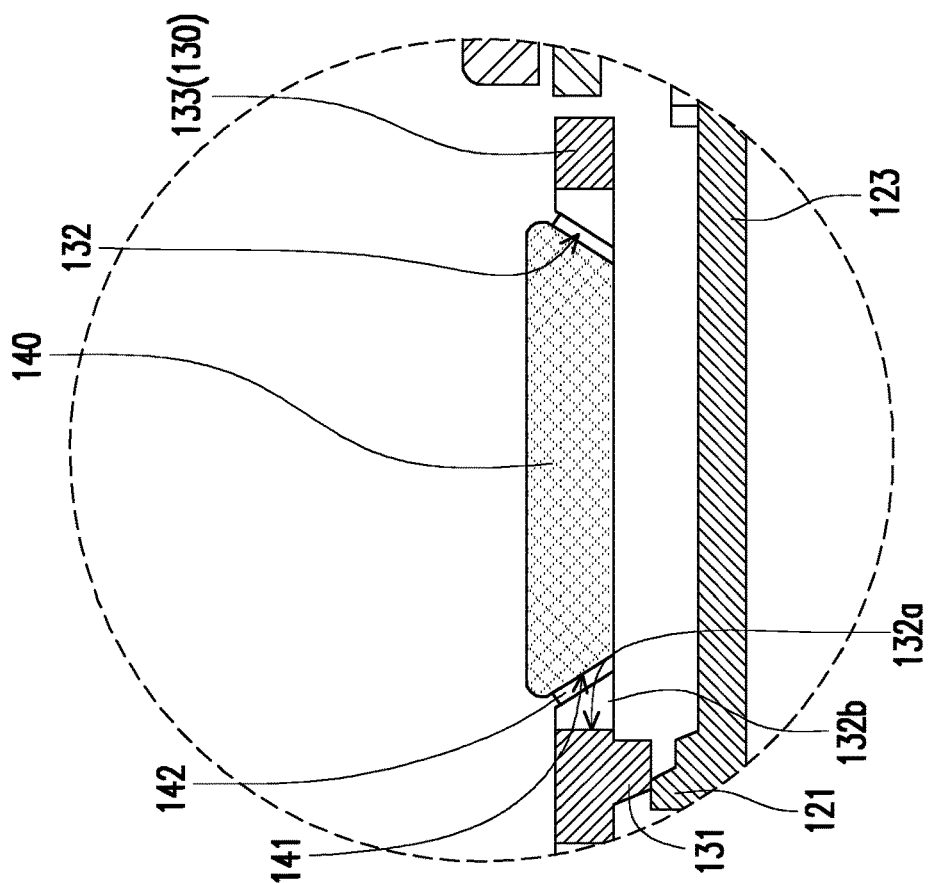
FIG. 3A and FIG. 3B are partial enlarged cross-sectional schematic views of the adjustable keyboard in FIG. 2C at two different states.
Figure 3A:
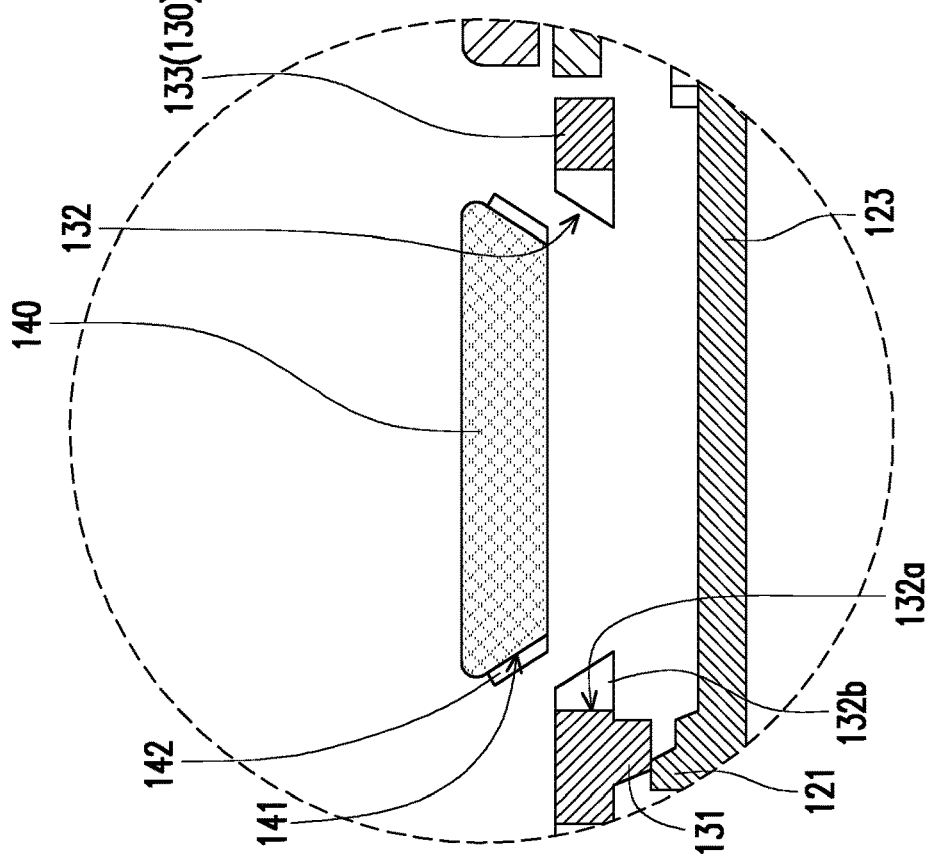

FIG. 3A and FIG. 3B are partial enlarged cross-sectional schematic views of the adjustable keyboard in FIG. 2C at two different states. Referring to FIG. 2C, FIG. 3A, and FIG. 3B, take each of the keys 140 has the minimum pressing stroke as an example, when the user presses any of the keys 140, at least a part of the key 140 is moved into the key opening 132, and the outer edge of the key 140 is in contact with the inner edge of the key opening 132. Furthermore, the key 140 is pressed downwards from the initial state shown in FIG. 3A, and the key 140 stops moving after the outer edge of the key 140 is in contact with the inner edge of the key opening 132, so as to define the pressing stroke of the key 140.

In the present embodiment, the surface, which is configured to be in contact the inner edge of the key opening 132, of the key 140 is defined as an outer leaning surface 141. The surface, which is configured to be in contact with the outer edge of the key 140, of the key opening 132 is defined as an inner bearing surface 132a. In order to reduce the noise generated when the outer edge of the key 140 contacts the inner edge of the key opening 132, at least one of the outer leaning surface 141 of the key 140 and the inner bearing surface 132a of the key opening 132 is configured with a buffer layer. Herein, for example, the outer leaning surface 141 of the key 140 is configured with the first buffer layer 142, and the inner bearing surface 132a of the key opening 132 is configured with the second buffer layer 132b which is matched with the first buffer layer 142, but the disclosure is not limited thereto.

To be more specific, the first buffer layer 142 is attached to the outer leaning surface 141 of the key 140 and may be an annular buffer layer. The second buffer layer 132b is attached to the inner bearing surface 132a of the key opening 132 and may be an annular buffer layer. For example, the first buffer layer 142 and the second buffer layer 132b may be made of silicone or rubber. When the outer edge of the key 140 is in contact with the inner edge of the key opening 132, the key 140 contacts the second buffer layer 132b through the first buffer layer 142, so as to provide a buffering effect to reduce the noise generated when the outer edge of the key 140 contacts the inner edge of the key opening 132.

Further, the first buffer layer 142 is attached to the periphery of the outer leaning surface 141 of the key 140, so as to define an outer diameter OD of the key 140, and the outer diameter OD may gradually decrease in the second moving direction D2 towards the first plate 120. On the other hand, the second buffer layer 132b is attached to the periphery of the inner bearing surface 132a of the key opening 132, so as to define an inner diameter ID of the key opening 132, and the inner diameter ID may gradually decrease in the second moving direction D2 towards the first plate 120. To be more specific, the inner diameter ID of the key opening 132 has a maximum value at a position far from the first plate 120, and the inner diameter ID of the key opening 132 has a minimum value at a position close to the first plate 120. On the other hand, the outer diameter OD of the key 140 has a maximum value at a position far from the first plate 120, and the outer diameter OD of the key 140 has a minimum value at a position close to the first plate 120. When the key 140 is pressed down, in order to make the key 140 move into the key opening 132 and to prevent the key 140 from moving through the key opening 132, the maximum value of the inner diameter ID of the key opening 132 is designed to be greater than the outer diameter OD of the key 140, and the maximum value of the outer diameter OD of the key 140 is designed to be greater than the minimum value of inner diameter ID of the key opening 132.

It should be noted here, the adjustable keyboard 100 may be designed to have a conductive film, rubber dome, and a scissor structure, which are common structural design in the field and thus are not shown in the drawings and are not described in details about arrangement and operating principle. Moreover, it should be understood that the first plate 120 needs to have corresponding openings, and the number of the openings is equal to the number of the key openings 132, so as to accommodate the rubber dome and scissor structure and to avoid structural interference with the rubber dome and scissor structure during operation.

Referring to FIG. 1A to FIG. 1C and FIG. 2A, in the present embodiment, the adjustable keyboard 100 further includes a case 150, and the driving element 110, the first plate 120, and the second plate 130 are movably disposed in the case 150. Furthermore, the first plate 120 and the second plate 130 are located inside the case 150, and at least a portion of the driving element 110 is located outside of the case 150 so that the user can operate conveniently. Furthermore, the case 150 has an assembling hole 151, the driving element 110 is located outside the assembling hole 151, and the second plate 130 and at least a portion of the first plate 120 are located inside the assembling hole 151. On the other hand, the keys 140 are located right above the assembling hole 151.

To be more specific, the first plate 120 further includes a driven part 122 and the first moving part 123 connected to the driven part 122, at least a portion of the driven part 122 is located outside of the assembling hole 151, and the driving element 110 is mechanically coupled to the driven part 122. The first guide portions 121 are located on the first moving part 123, and the first moving part 123 is located inside the assembling hole 151. On the other hand, the second plate 130 further includes the second moving part 131, the second guide portions 131 are located on the second moving part 133, and the first guide portions 121 and the second guide portions 131 are located between the first moving part 123 and the second moving part 133. For example, the first moving part 123 and the second moving part 133 are parallel to each other, the first guide portion 121 extends from the first moving part 123 towards the second moving part 133, and the second guide portions 131 extends from the second moving part 133 towards the first moving part 123. The key openings 132 penetrate through the second moving part 133, each of two opposite sides of each of the key opening 132 is configured with at least one second guide portion 131, or one key opening 132 is disposed between any two adjacent second guide portions 131.

In the present embodiment, the driving element 110 rotatably penetrates through the case 150, the driving element 110 includes a rotating part 111 and a drive gear 112 opposite to the rotating part 111, and the rotating part 111 is located outside the case 150, so it is convenient for the user to operate. The drive gear 112 is located inside the case 150 and is engaged with a driven gear rack 122a of the first plate 120, and the driven gear rack 122a is connected to the driven part 122. Therefore, the first plate 120 is moved in the first moving direction D1 by the cooperation and the relative movement of the drive gear 112 and the driven gear rack 122a.

In the following, other similar embodiments will be described. The same or similar configuration and operating principles in the embodiments are not repeated, and only the differences between the embodiments are explained in detail.

Figure 4:
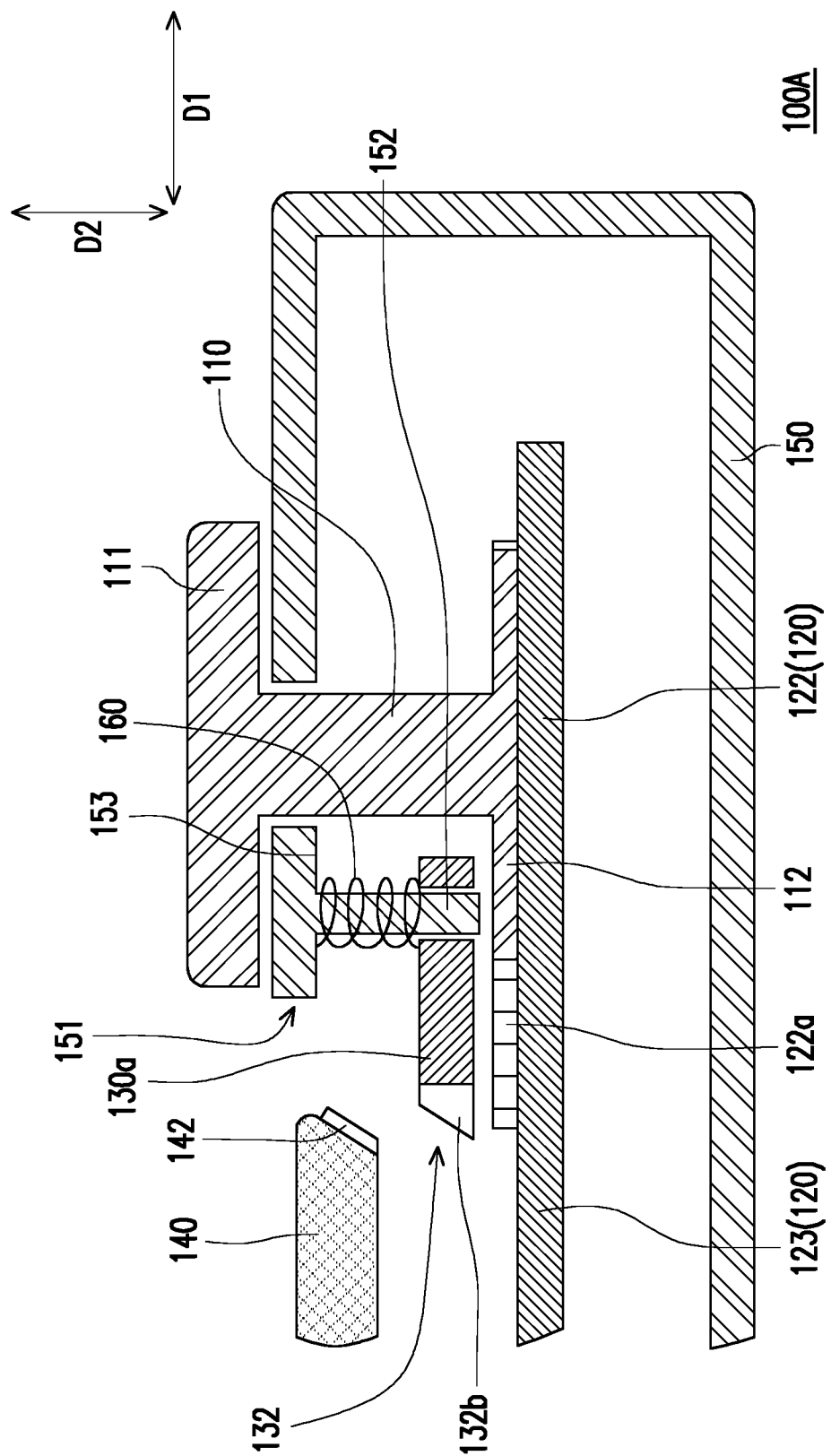
FIG. 4 is a partial cross-sectional schematic view of an adjustable keyboard according to the second embodiment of the disclosure.

FIG. 4 is a partial cross-sectional schematic view of an adjustable keyboard according to the second embodiment of the disclosure. Referring to FIG. 4, compared to the adjustable keyboard 100 of the first embodiment, an adjustable keyboard 100A of the present embodiment further includes a guiding member 152, the guiding member 152 may adopt a guiding column, and the guiding member 152 extends along the second moving direction D2 and penetrates through the second plate 130a. Furthermore, the guiding member 152 may be located outside the assembling hole 151 and is connected to an inner wall surface 153 of the case 150. Accordingly, at least a portion of the second plate 130a extends to outside of the assembling hole 151, and the guiding member 152 penetrates through the portion of the second plate 130a located outside of the assembling hole 151. Thus, the second plate 130a may be guided by the guiding member 152 so as to stability moved along the second moving direction D2.

On the other hand, the adjustable keyboard 100A further includes an elastic member 160 sleeved on the guiding member 152, and two ends of the elastic member 160 are respectively connected to a fixed end (such as the inner wall surface 153 of the case 150) and the second plate 130a. The elastic member 160 may adopt a compressed spring. When the second plate 130a is moved in the second moving direction D2 to be close to the fixed end (such as the inner wall surface 153 of the case 150), the elastic member 160 is compressed. When the second plate 130a is moved in the second moving direction D2 to be far from the fixed end (such as the inner wall surface 153 of the case 150), the elastic-restoring force of the elastic member 160 can assist in driving the second plate 130a. Since the elastic member 160 is sleeved on the guiding member 152, the elastic member 160 is not easily twisted or deviated.

Figure 5A:
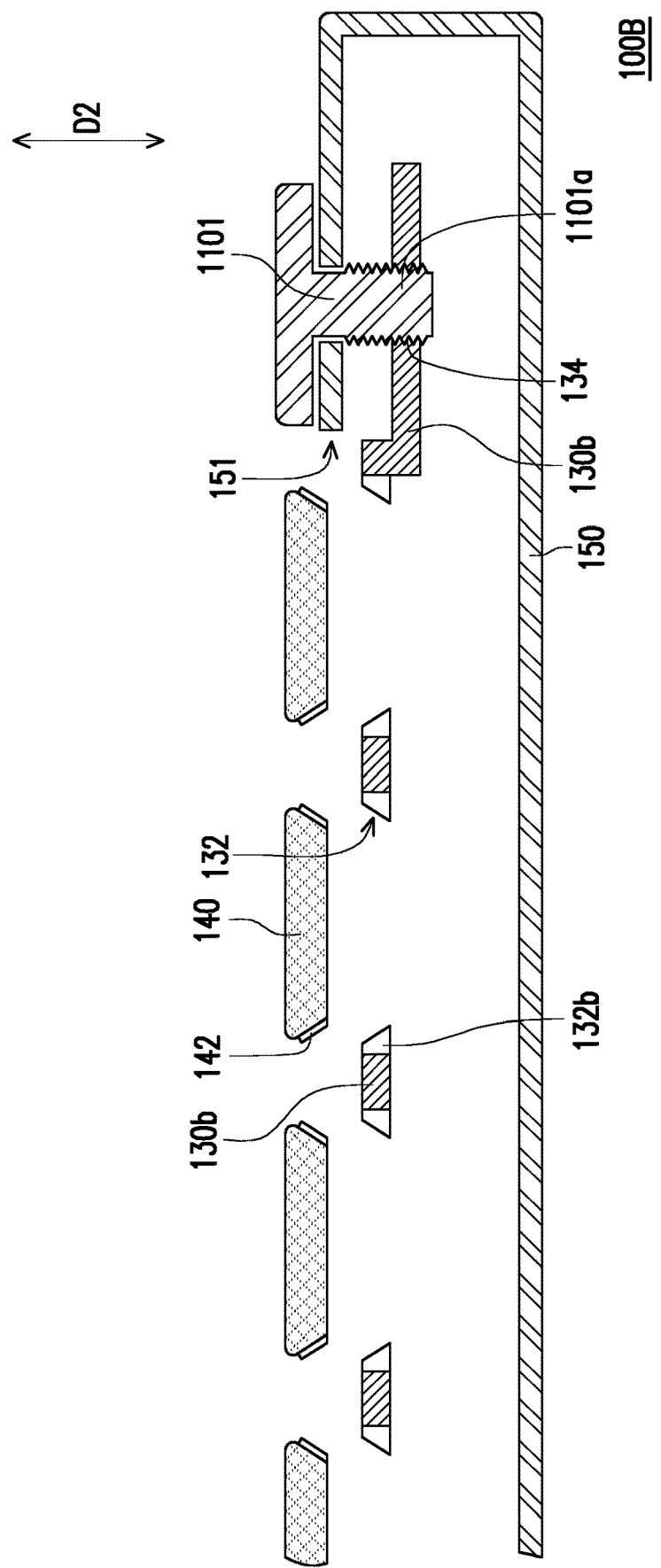
FIG. 5A and FIG. 5B are partial cross-sectional schematic views of an adjustable keyboard at two different states according to the third embodiment of the disclosure.
Figure 5B:
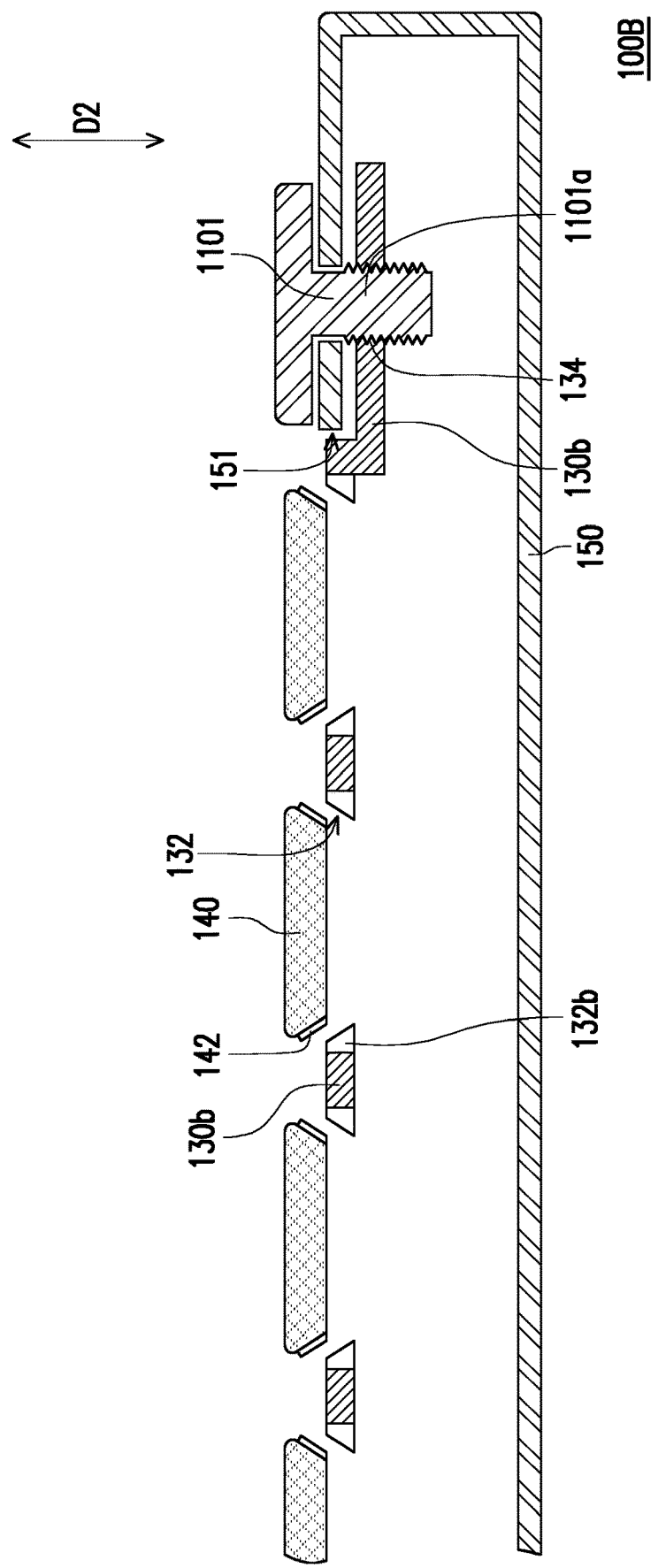

FIG. 5A and FIG. 5B are partial cross-sectional schematic views of an adjustable keyboard at two different states according to the third embodiment of the disclosure. Referring to FIG. 5A and FIG. 5B, compared to the adjustable keyboard 100 of the first embodiment, an adjustable keyboard 100B of the present embodiment is not configured with the first plate 120 (shown in FIG. 2A). At least a portion of the second plate 130b extends to outside of the assembling hole 151, and a column 1101a of a driving element 1101 extends into the case 150 and penetrates through the second plate 130b. Furthermore, the second plate 130b has a through hole 134, and the external thread of the column 1101a engages the internal thread of the through hole 134. Because of the rotation of the column 1101a and the cooperation of the external thread of the column 1101a and the internal thread of the through hole 134, the second plate 130b can be driven to ascend or descend.

Figure 6:
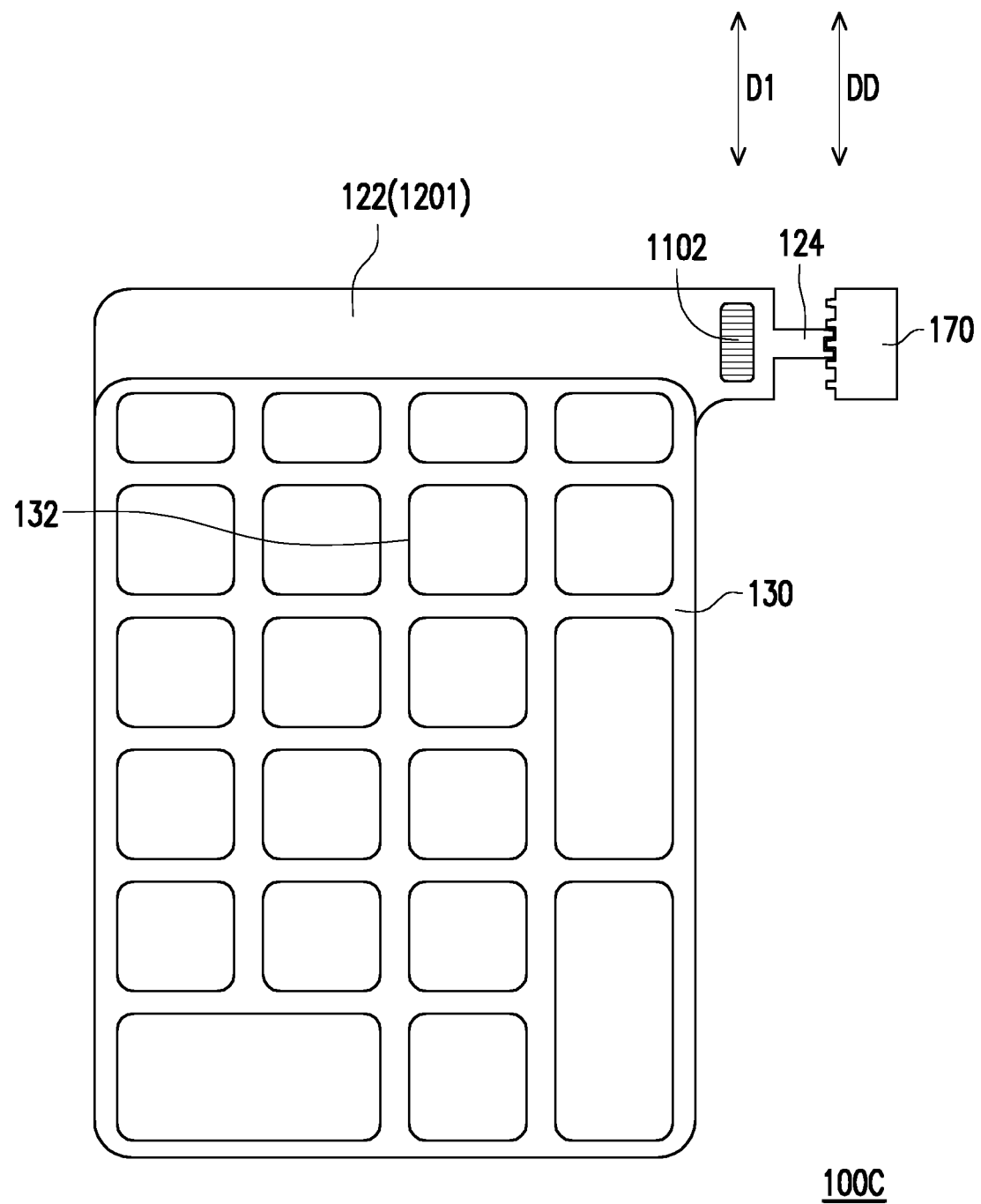
FIG. 6 is a schematic top view of the interior of an adjustable keyboard according to the fourth embodiment of the disclosure.

FIG. 6 is a schematic top view of the interior of an adjustable keyboard according to the fourth embodiment of the disclosure. Referring to FIG. 6, compared to the adjustable keyboard 100 of the first embodiment, a driving element 1102 of an adjustable keyboard 100C of the present embodiment is configured to slide along a driving direction DD, the driving element 1102 is fixed to the driven part 122 of the first plate 1201, and the driving direction DD is parallel to the first moving direction D1. To be more specific, the driving element 1102 and the first plate 1201 can move synchronously in the same direction. On the other hand, the first plate 1201 further includes a positioning part 124 extending from the driven part 122, and the adjustable keyboard 100C further includes a positioning member 170. The positioning part 124 is located between the positioning member 170 and the driven part 122, and the positioning part 124 is mechanically coupled to the positioning member 170. For example, the position of the positioning member 170 can be maintained to be the same, and the positioning member 170 further includes a plurality of positioning concave and convex structures. On the other hand, the positioning part 124 can move relative to the positioning member 170, so as to be locked to different positions.

Figure 7:
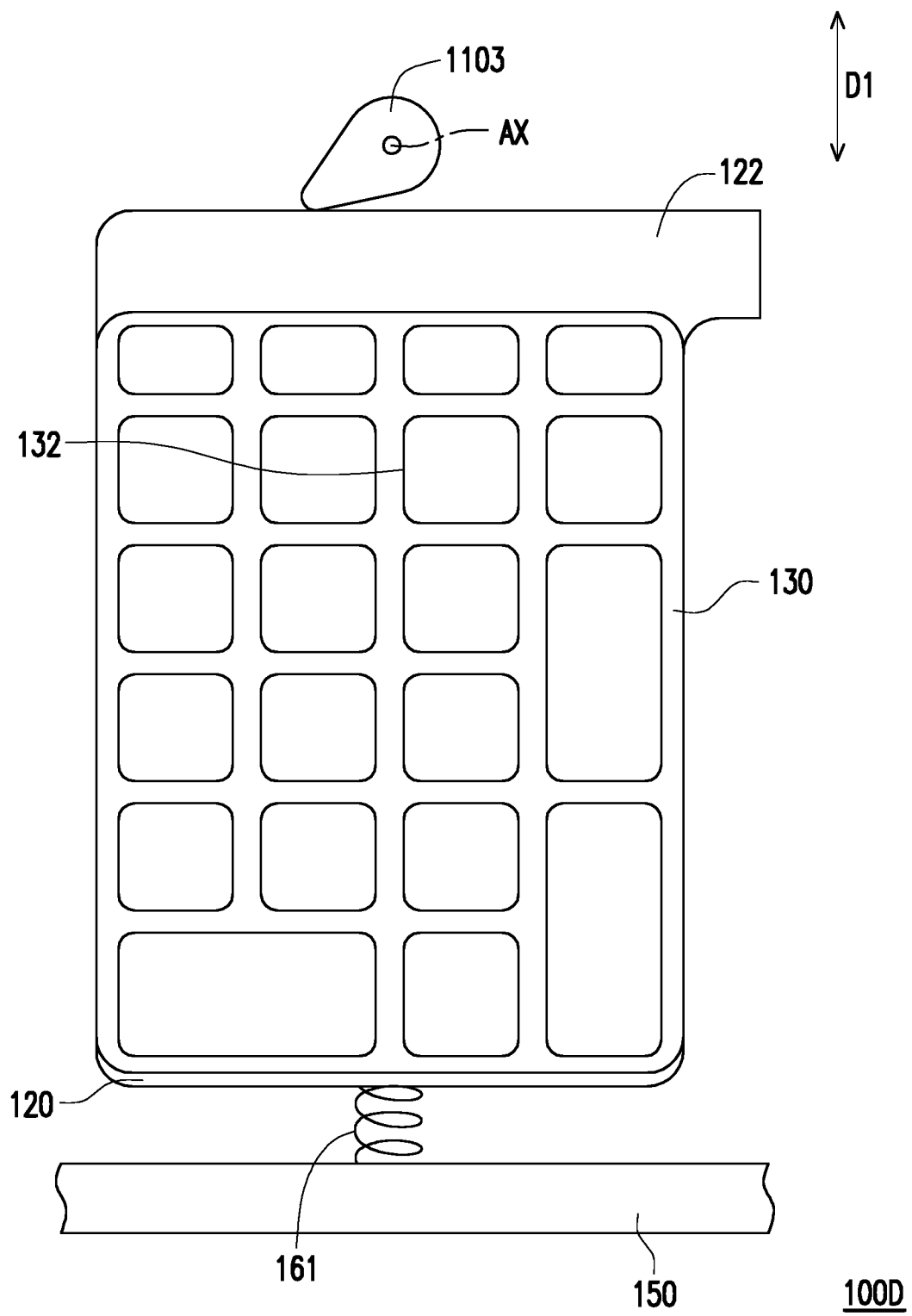
FIG. 7 is a schematic top view of the interior of an adjustable keyboard according to the fifth embodiment of the disclosure.

FIG. 7 is a schematic top view of the interior of an adjustable keyboard according to the fifth embodiment of the disclosure. Referring to FIG. 7, compared to the adjustable keyboard 100 of the first embodiment, a driving element 1103 of an adjustable keyboard 100D of the present embodiment adopts a cam configured to abut against the driven part 122 of the first plate 120. Based on the geometric design of the outer profile of the cam, during rotation, the cam may cause different moving distances of the first plate 120. On the other hand, the adjustable keyboard 100D further includes an elastic member 161, and two opposite ends of the elastic member 161 are respectively connected to a fixed end (such as the inner wall surface 153 of the case 150) and the first plate 120. Furthermore, the driving element 1103 and the elastic member 161 are located at two opposite sides of the first plate 120, and the elastic member 161 may adopt a compressed spring. When the first plate 120 is moved in the first moving direction D1 to be close to the fixed end (such as the inner wall surface 153 of the case 150), the elastic member 161 is compressed. When the first plate 120 is moved in the first moving direction D1 to be far from the fixed end (such as the inner wall surface 153 of the case 150), the elastic-restoring force of the elastic member 161 can assist in driving the first plate 120.

In summary, the adjustable keyboard of the disclosure is configured with a mechanical adjustment mechanism, so the user can actively and intuitively adjust the pressing stroke of the key according to personal requirements, so as to obtain different hand feelings while operating the adjustable keyboard. To be more specific, the user can actively operate the driving element to drive the first plate to move through the driving element, and the first plate drives the second plate to adjust the distance between the second plate and a plurality of keys. The pressing stroke of the keys is decreased or increased by decreasing or increasing the distance between the keys and the second plate. In other words, the adjustable keyboard of the disclosure has an excellent operation flexibility.

On the other hand, the second plate has a plurality of key openings, and the keys are respectively aligned with the key openings. After each of the keys is pressed, at least a portion of each key is moved into the corresponding key opening, and the outer edge of each key contacts with the inner edge of the corresponding key opening. Since at least one of the outer edge of each key and the inner edge of the corresponding key opening is configured with a buffer layer, the noise generated when the outer edge of each key contacts the inner edge of the corresponding key opening is reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An adjustable keyboard, comprising:
   a driving element, configured to rotate around an axis or slide along a driving direction;
   a first plate, mechanically coupled to the driving element, wherein the first plate comprises a plurality of first guide portions, and the first plate is configured to be driven by the driving element to move along a first moving direction;
   a second plate, disposed above the first plate, wherein the second plate comprises a plurality of second guide portions, each of the first guide portions abuts against one of the second guide portions, and the second plate is configured to be driven by the first plate to move along a second moving direction; and
   a plurality of keys, disposed above the second plate, wherein the second plate has a plurality of key openings, the keys are respectively aligned with the key openings, and a distance between each of the keys and the corresponding key opening is adjusted according to movement of the second plate.

2. The adjustable keyboard as recited in claim 1, further comprising:
   a case, wherein the driving element, the first plate, and the second plate are movably disposed in the case.

3. The adjustable keyboard as recited in claim 2, wherein the case has an assembling hole, the driving element is located outside the assembling hole, the first plate further comprises a driven part and a first moving part connected to the driven part, at least a portion of the driven part is located outside of the assembling hole, the driving element is mechanically coupled to the driven part, the first guide portions are located on the first moving part, the first moving part is located inside the assembling hole, the second plate is located inside the assembling hole, wherein the second plate further comprises a second moving part, the second guide portions are located on the second moving part, and the first guide portions and the second guide portions are located between the first moving part and the second moving part.

4. The adjustable keyboard as recited in claim 1, wherein each of the first guide portions has a stepped guide surface, each of the second guide portions has a trapezoidal guide surface, and the stepped guide surface of each of the first guide portions slidably abuts against the trapezoidal guide surface of the corresponding second guide portion.

5. The adjustable keyboard as recited in claim 1, wherein each of the keys has an outer leaning surface, each of the key openings has an inner bearing surface, at least one of the outer leaning surface of each of the keys and the inner bearing surface of the corresponding key opening is configured with a buffer layer.

6. The adjustable keyboard as recited in claim 1, wherein an inner diameter of each of the key openings gradually decreases in the second moving direction towards the first plate, and an outer diameter of each of the keys gradually decreases in the second moving direction towards the first plate.

7. The adjustable keyboard as recited in claim 1, wherein a maximum outer diameter of each of the keys is greater than a minimum inner diameter of the corresponding key opening.

8. The adjustable keyboard as recited in claim 1, wherein the driving element is configured to rotate around the axis, the driving element comprises a rotating part and a drive gear opposite to the rotating part, and the drive gear engages with a driven gear rack of the first plate.

9. The adjustable keyboard as recited in claim 1, wherein the driving element is configured to rotate around the axis, the driving element is a cam, and the cam abuts against the driven part of the first plate.

10. The adjustable keyboard as recited in claim 9, further comprising:
    an elastic member, having two opposite ends respectively connected to a fixed end and the first plate, wherein the driving element and the elastic member are located at two opposite sides of the first plate.

11. The adjustable keyboard as recited in claim 1, wherein the driving element is configured to slide along the driving direction, the driving element is fixed to a driven part of the first plate, the first plate further comprises a positioning part extending from the driven part, and the adjustable keyboard further comprises a positioning member, wherein the positioning part is located between the positioning member and the driven part, and the positioning part is mechanically coupled to the positioning member.

12. The adjustable keyboard as recited in claim 1, further comprising:
    a guiding member, extending along the second moving direction and penetrating through the second plate.

13. The adjustable keyboard as recited in claim 12, further comprising:
    an elastic member, sleeved on the guiding member, wherein two ends of the elastic member are respectively connected to a fixed end and the second plate.

* * * * *